Feb. 16, 1971    W. LE ROY BUSLER ET AL    3,562,903
ASSEMBLY OF TERMINALS TO BOBBINS
Filed April 30, 1968    16 Sheets-Sheet 1
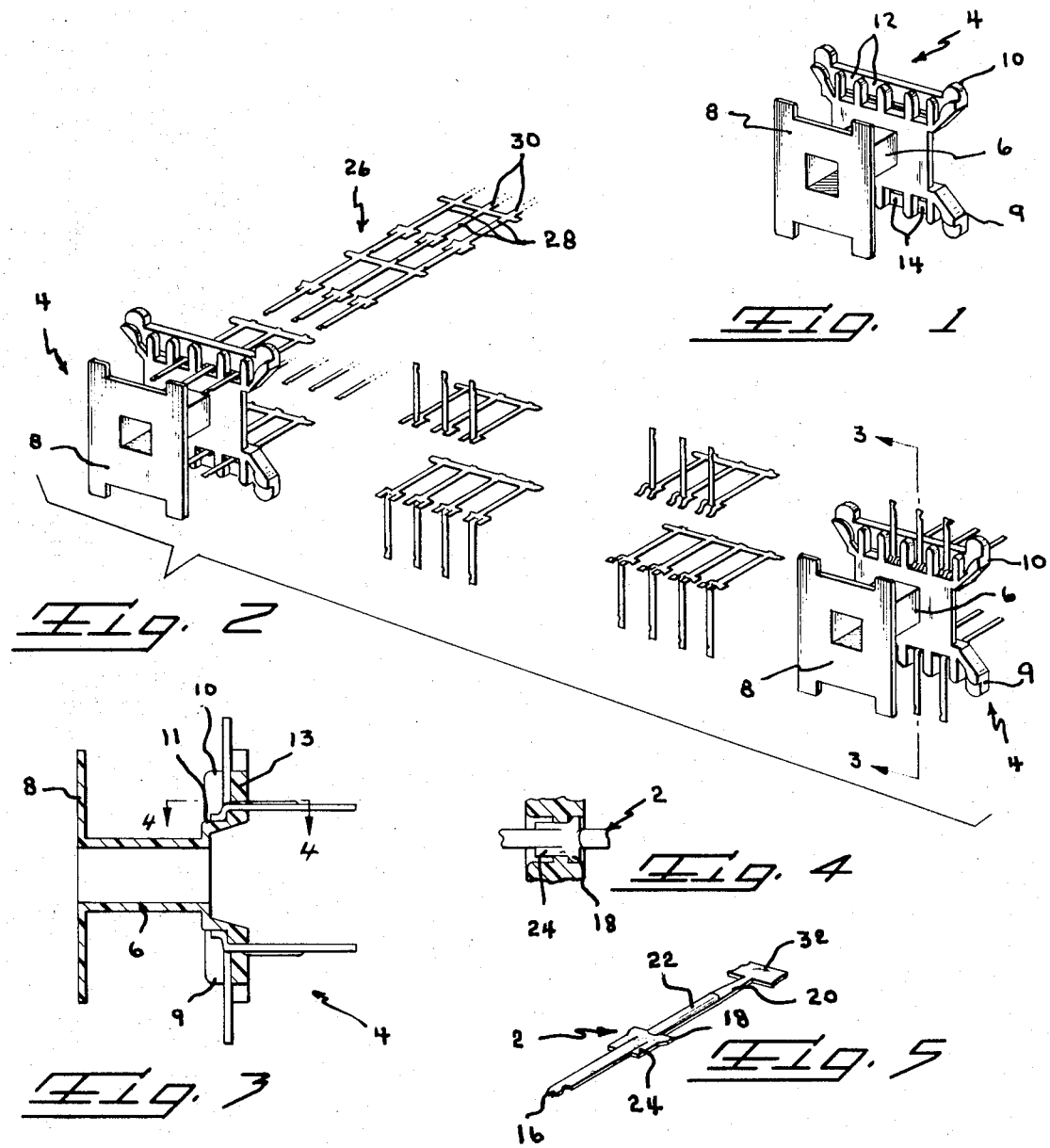
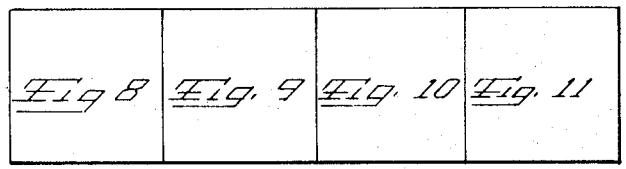
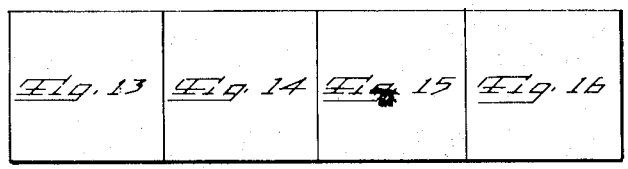

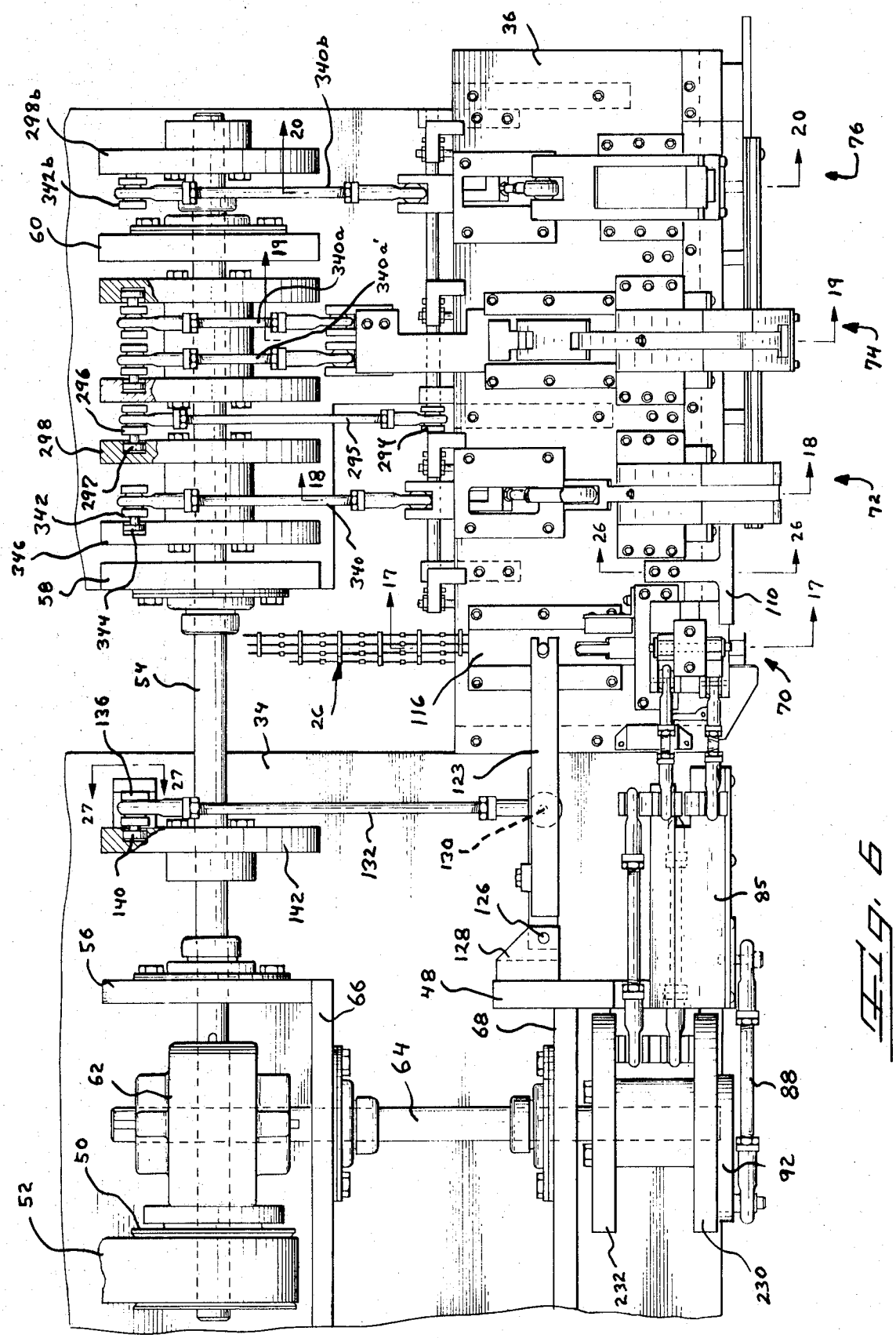

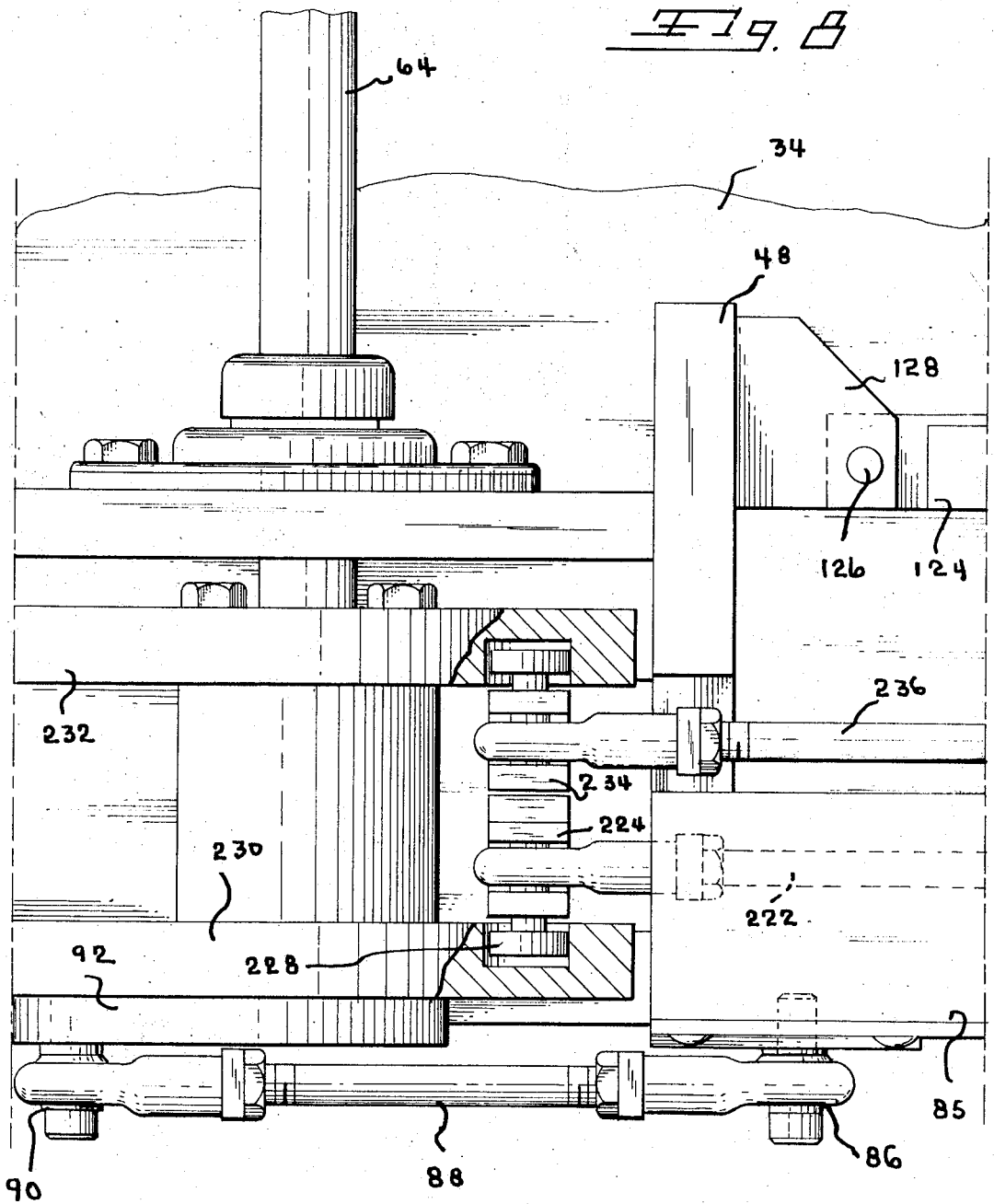

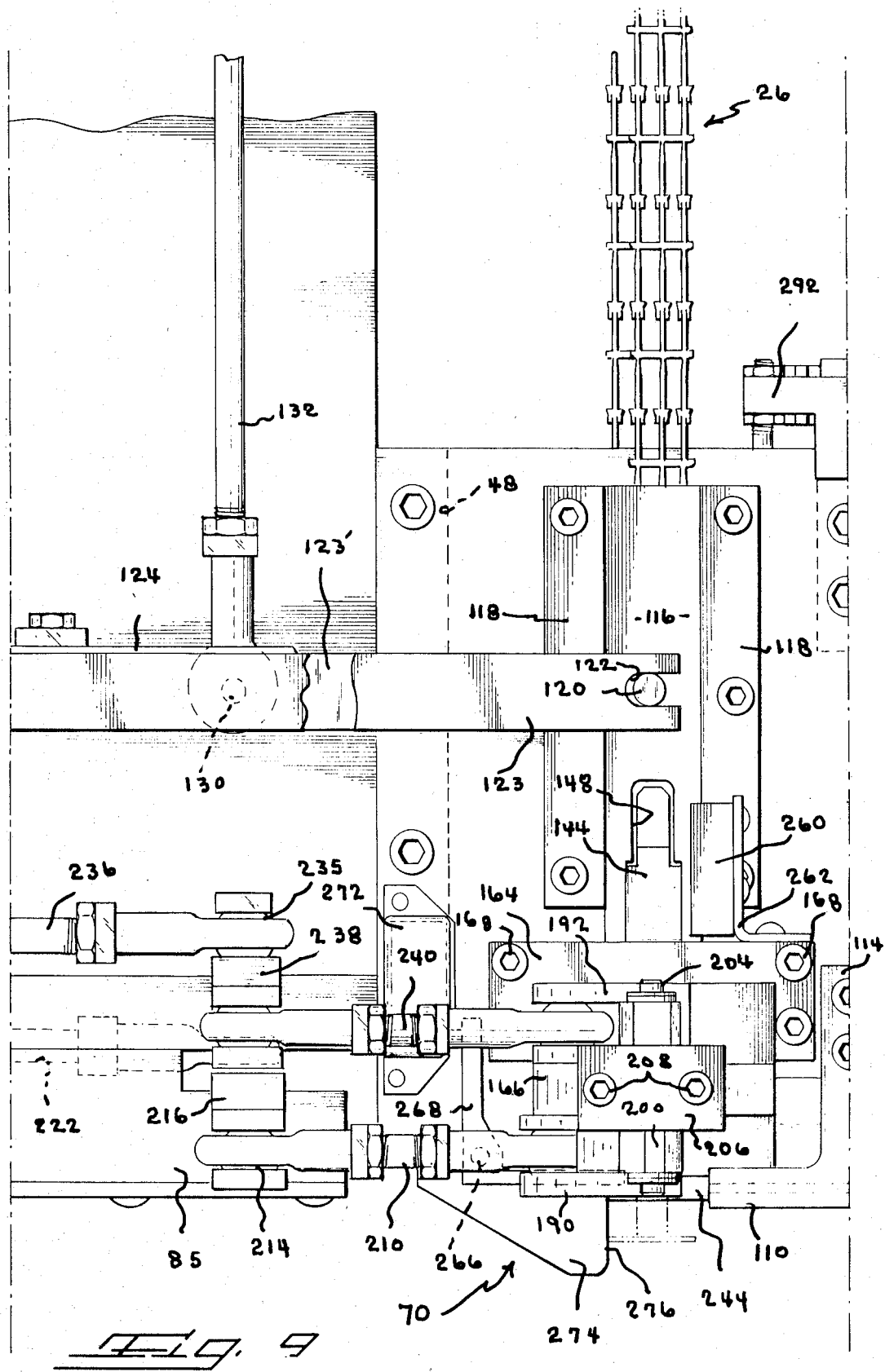

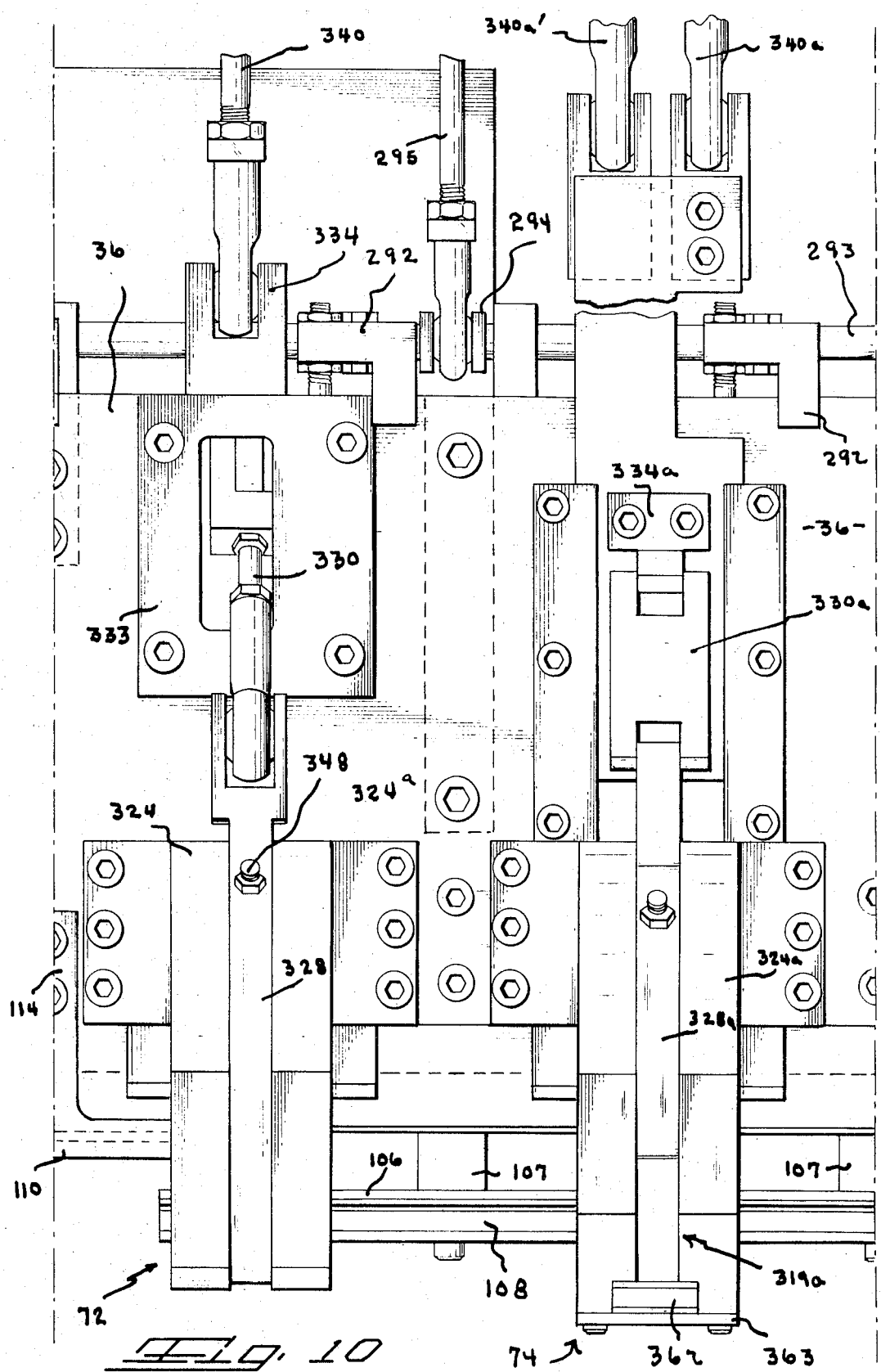

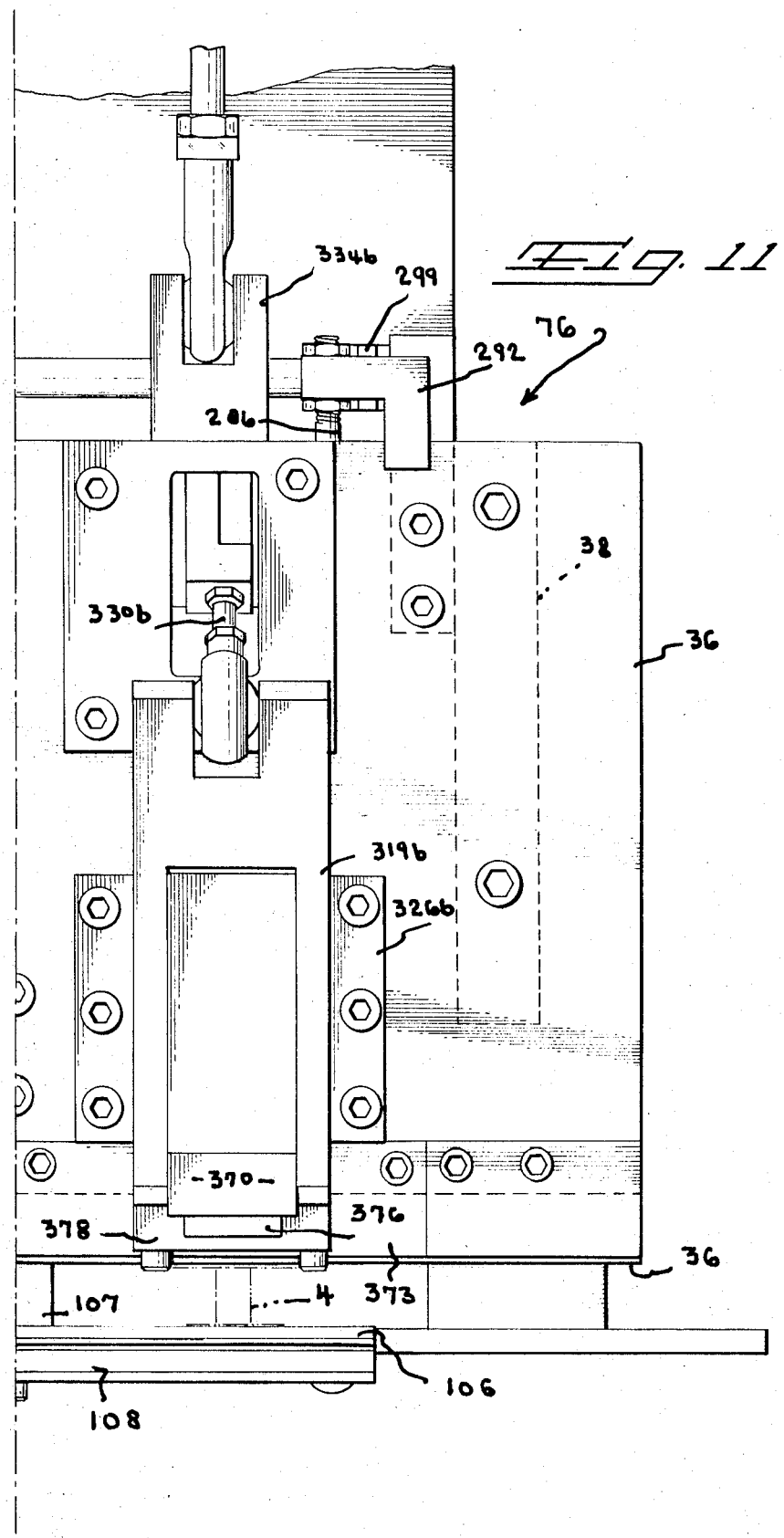

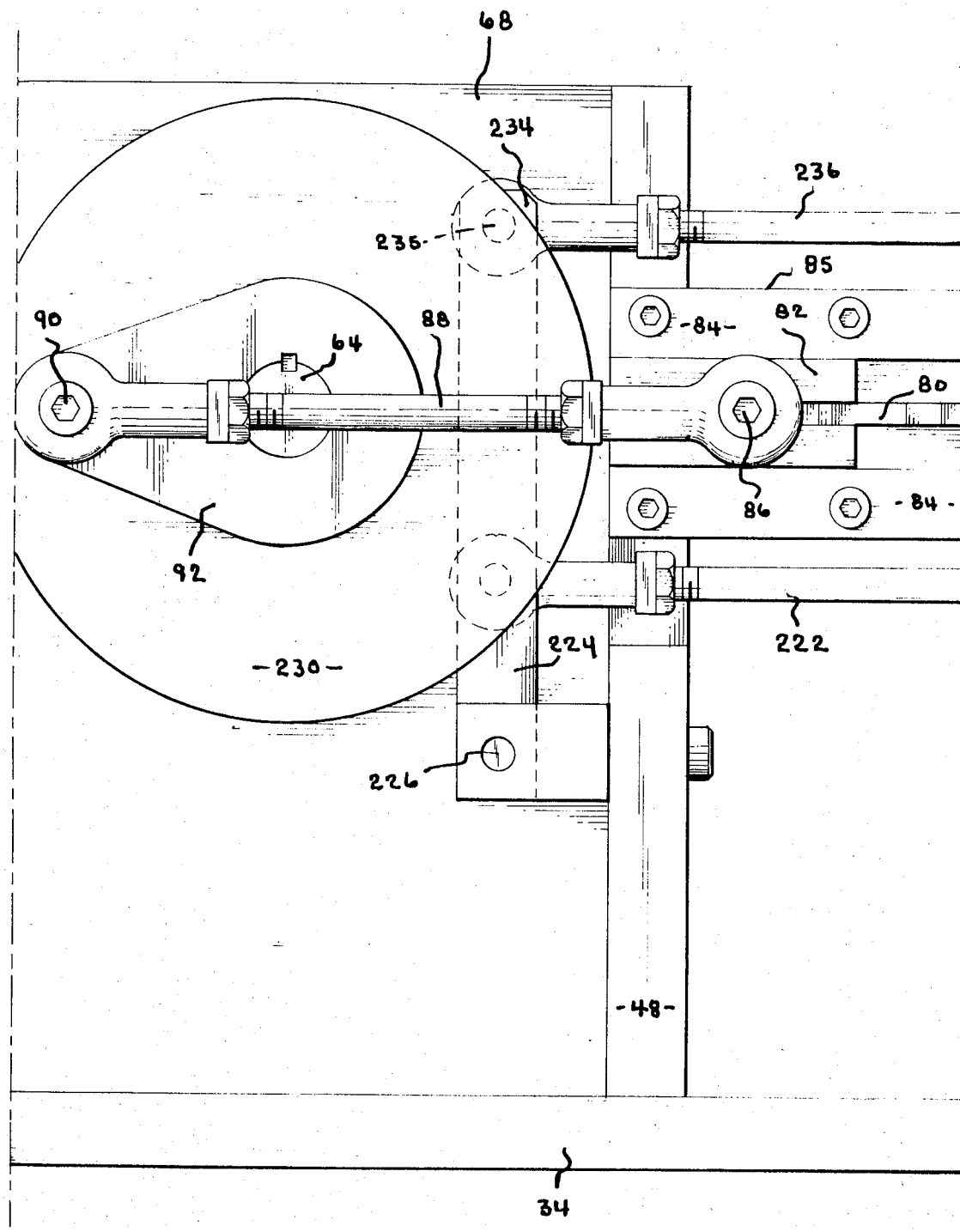

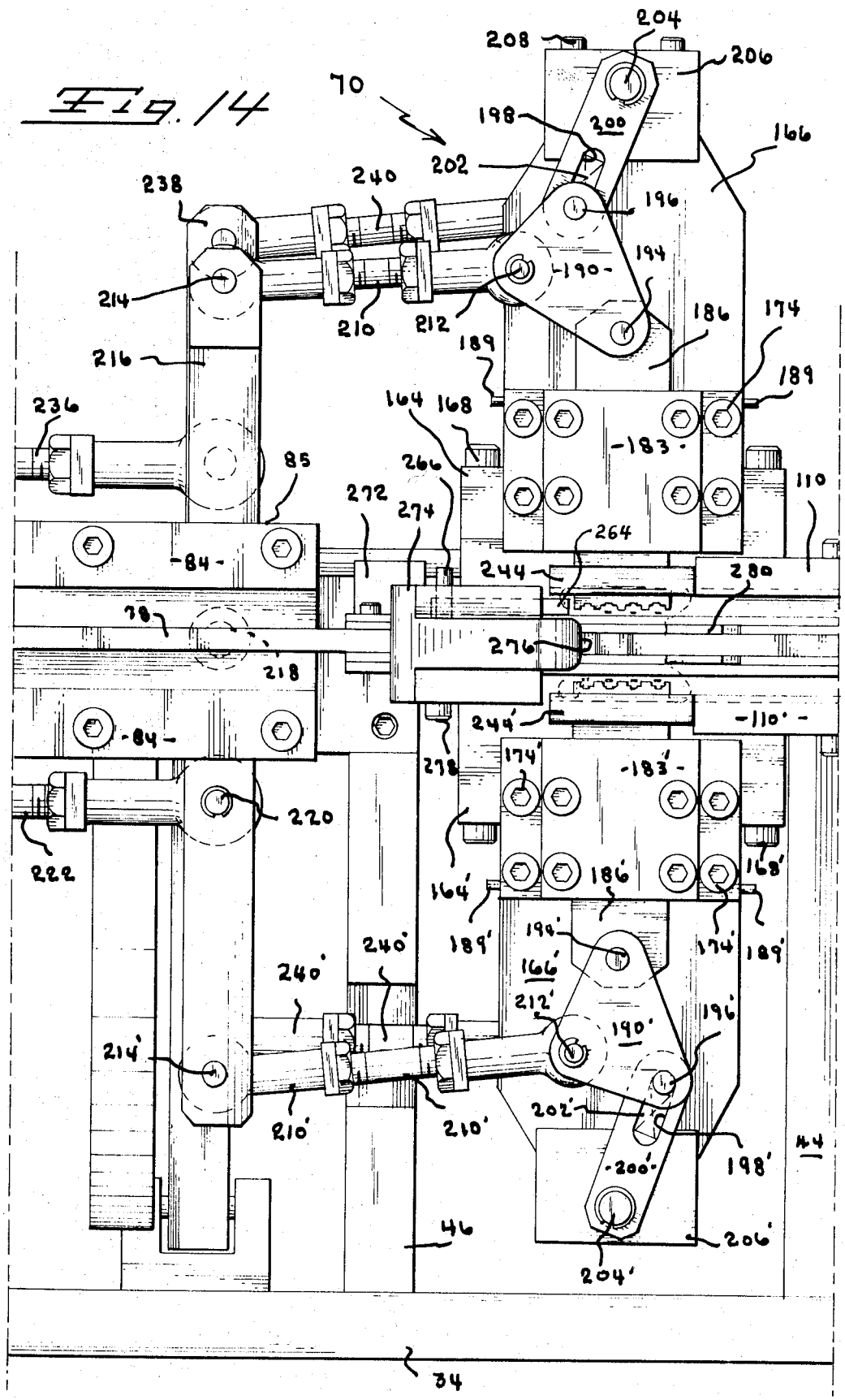

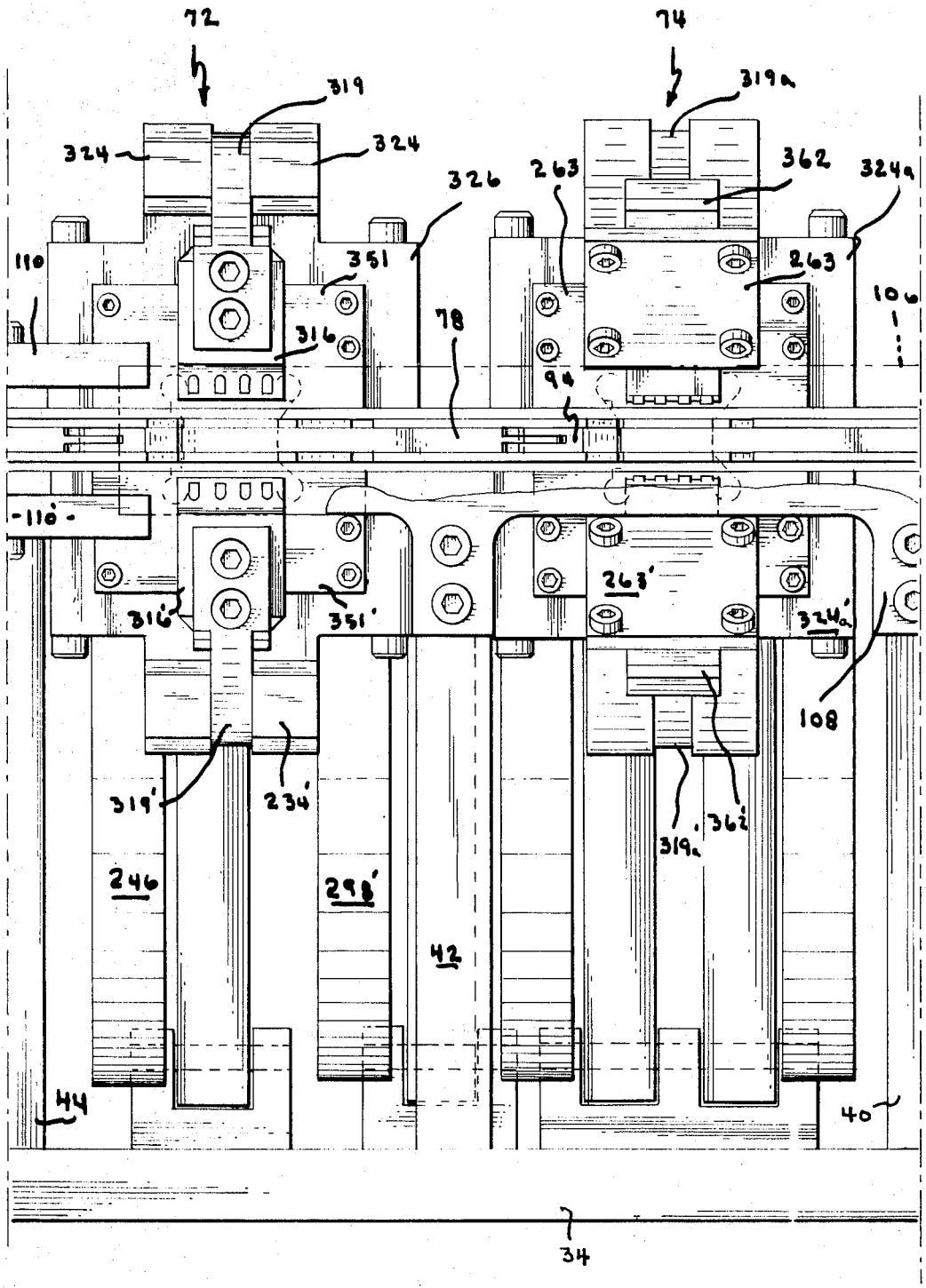

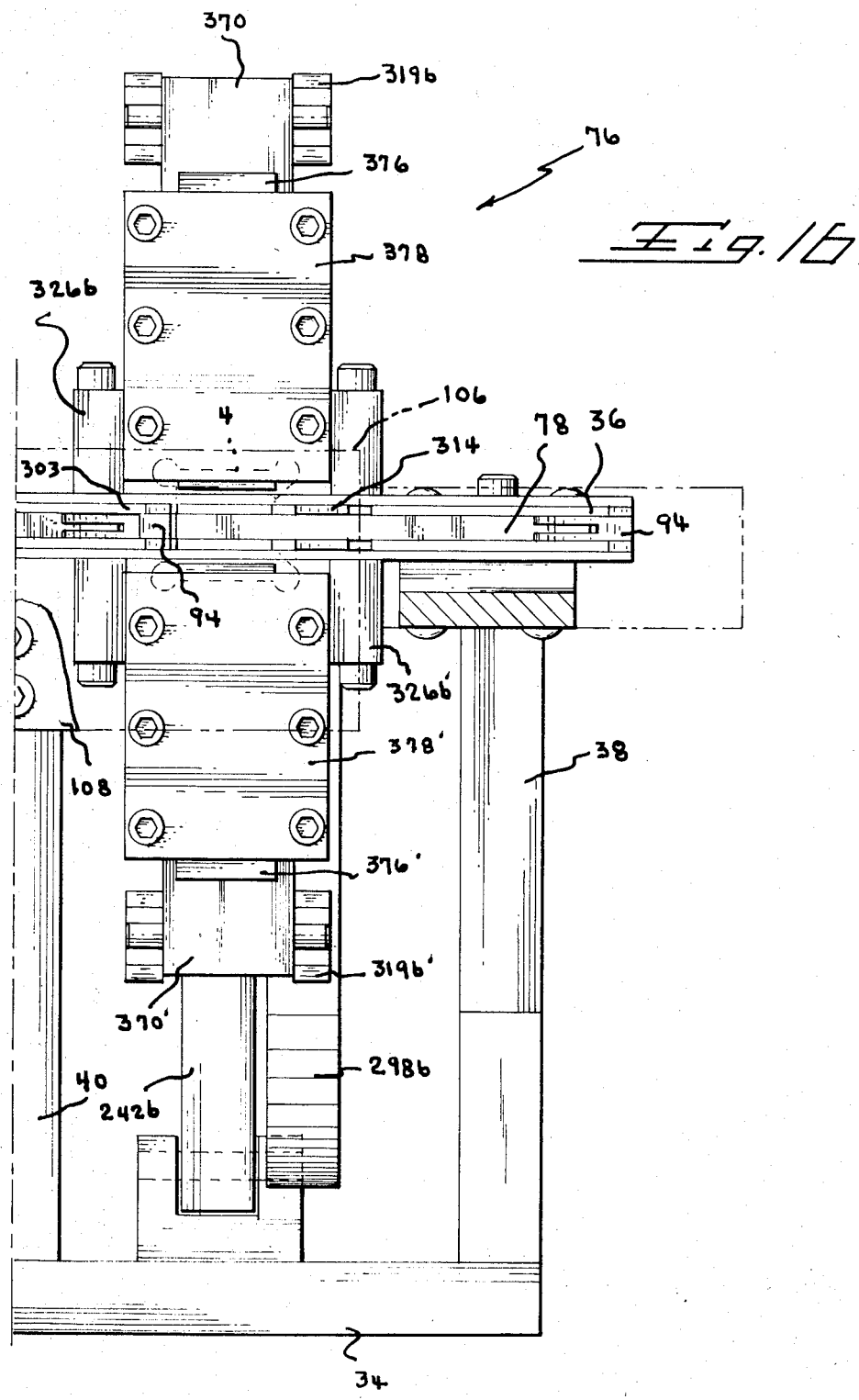

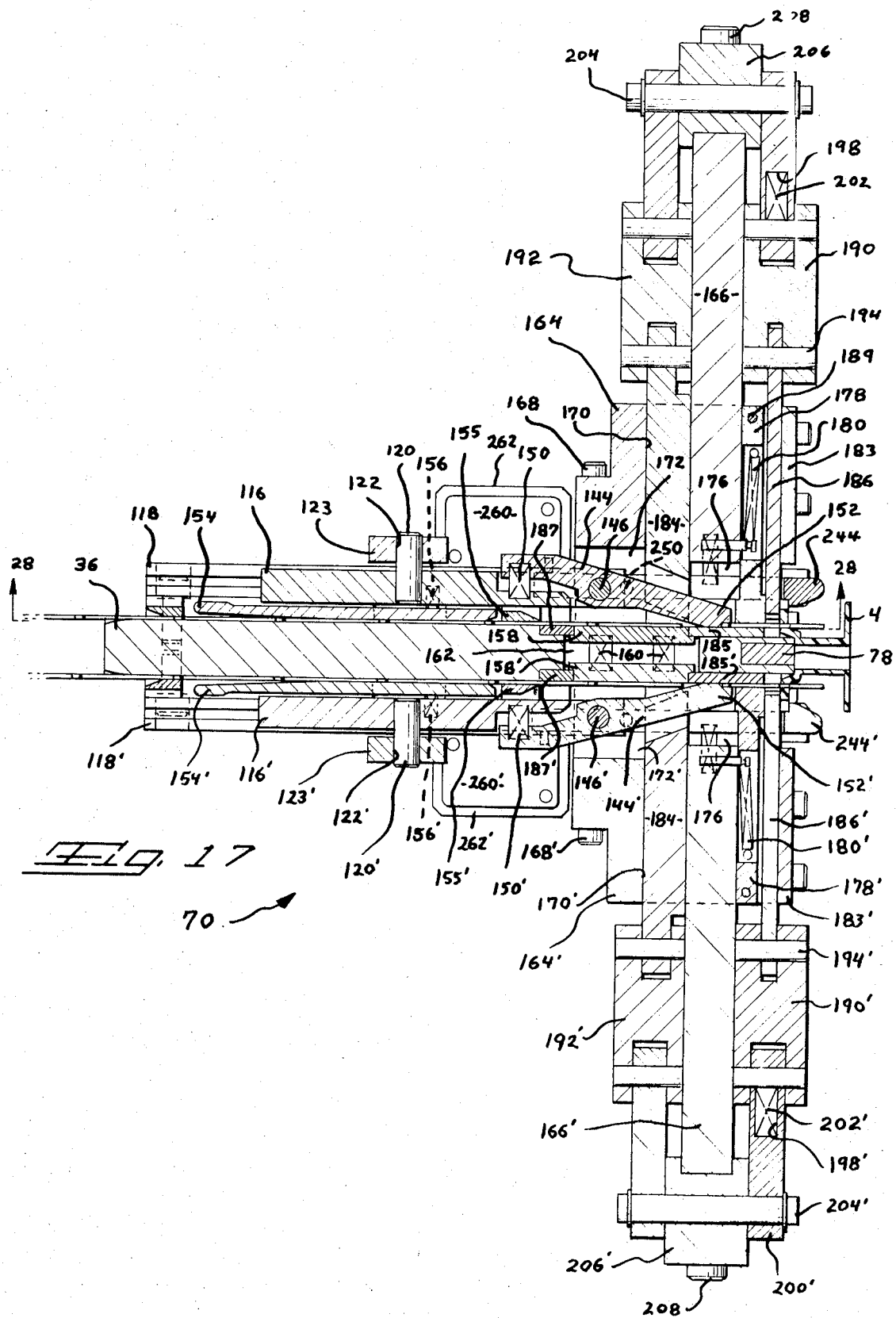

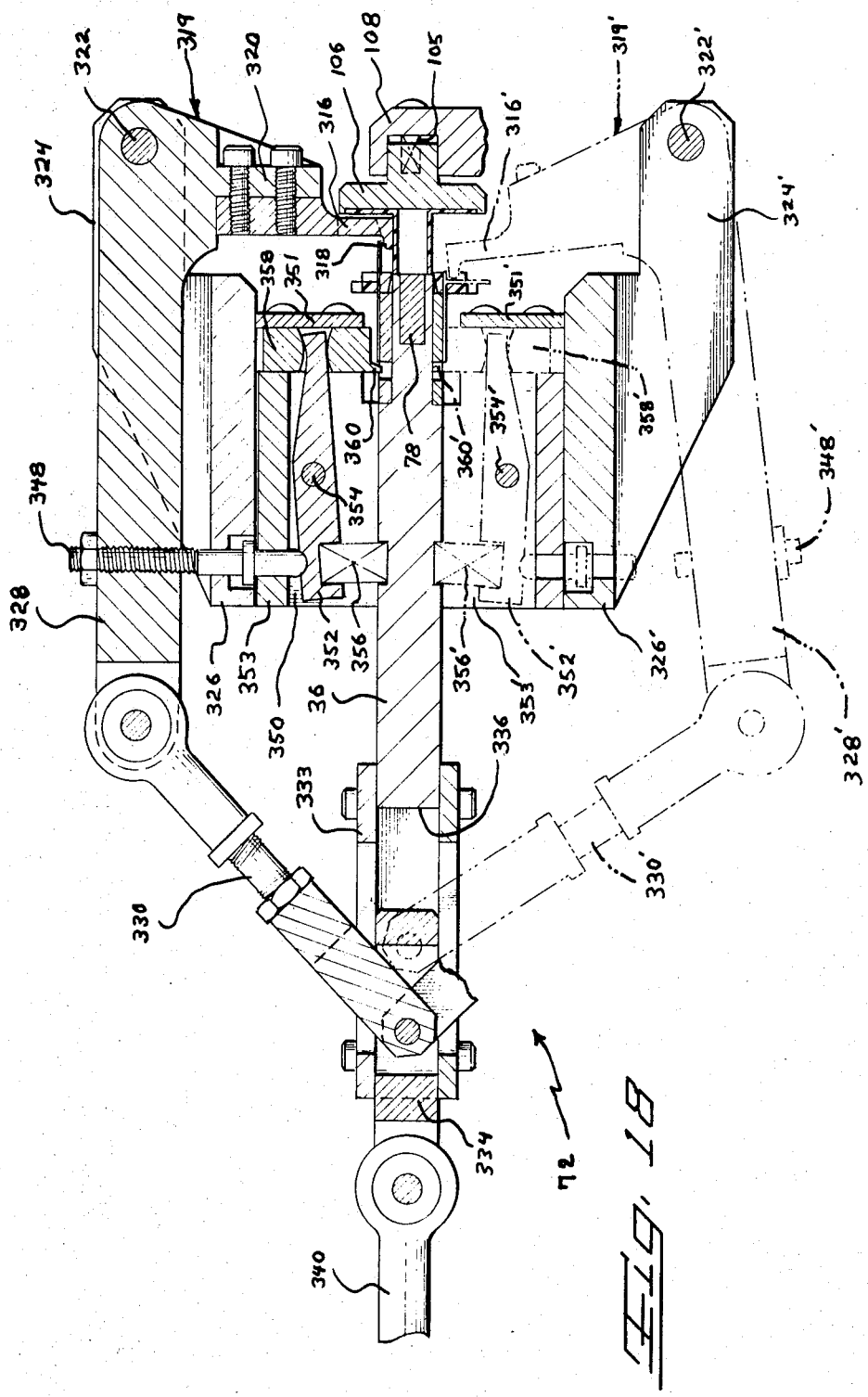

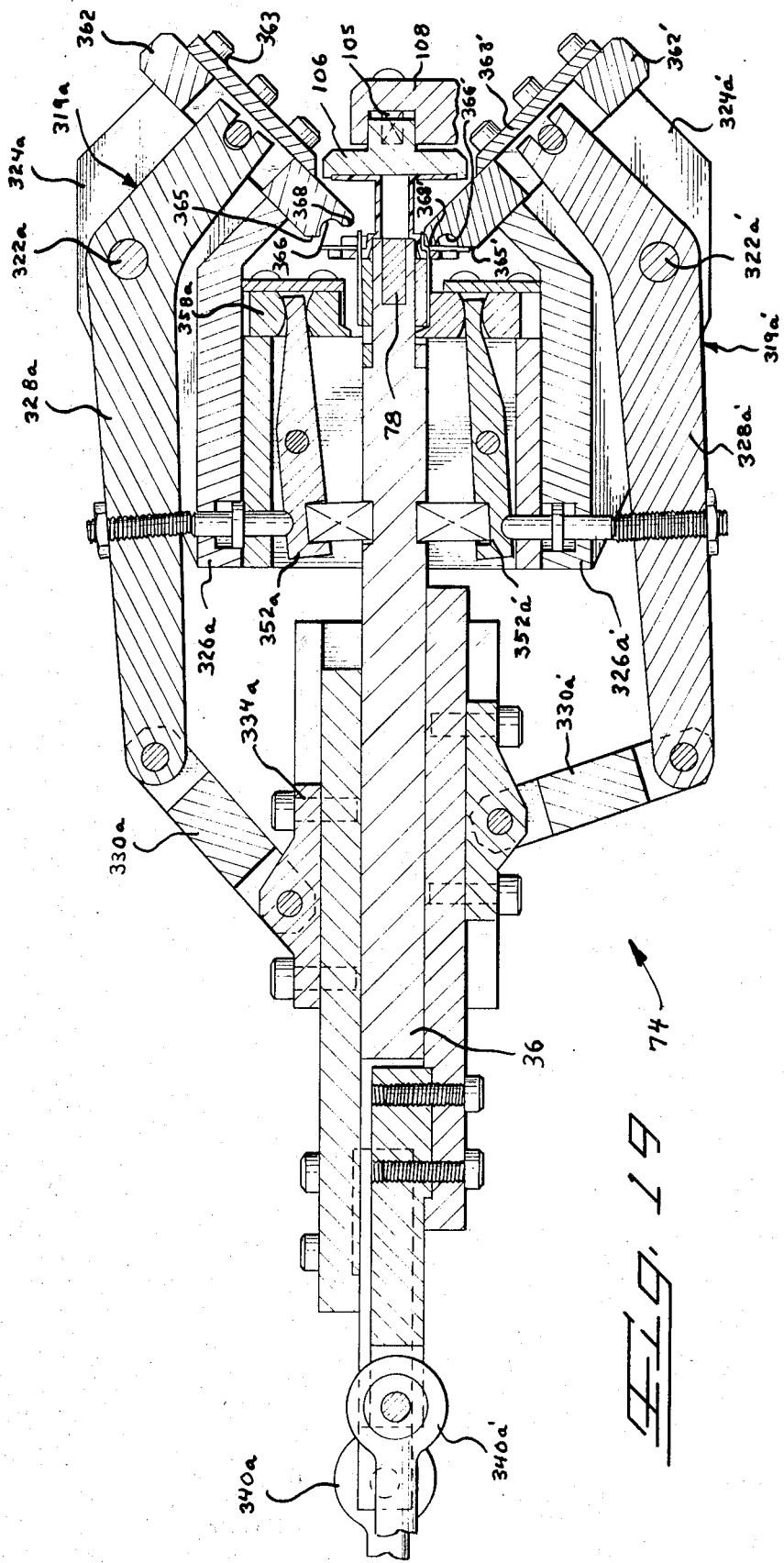

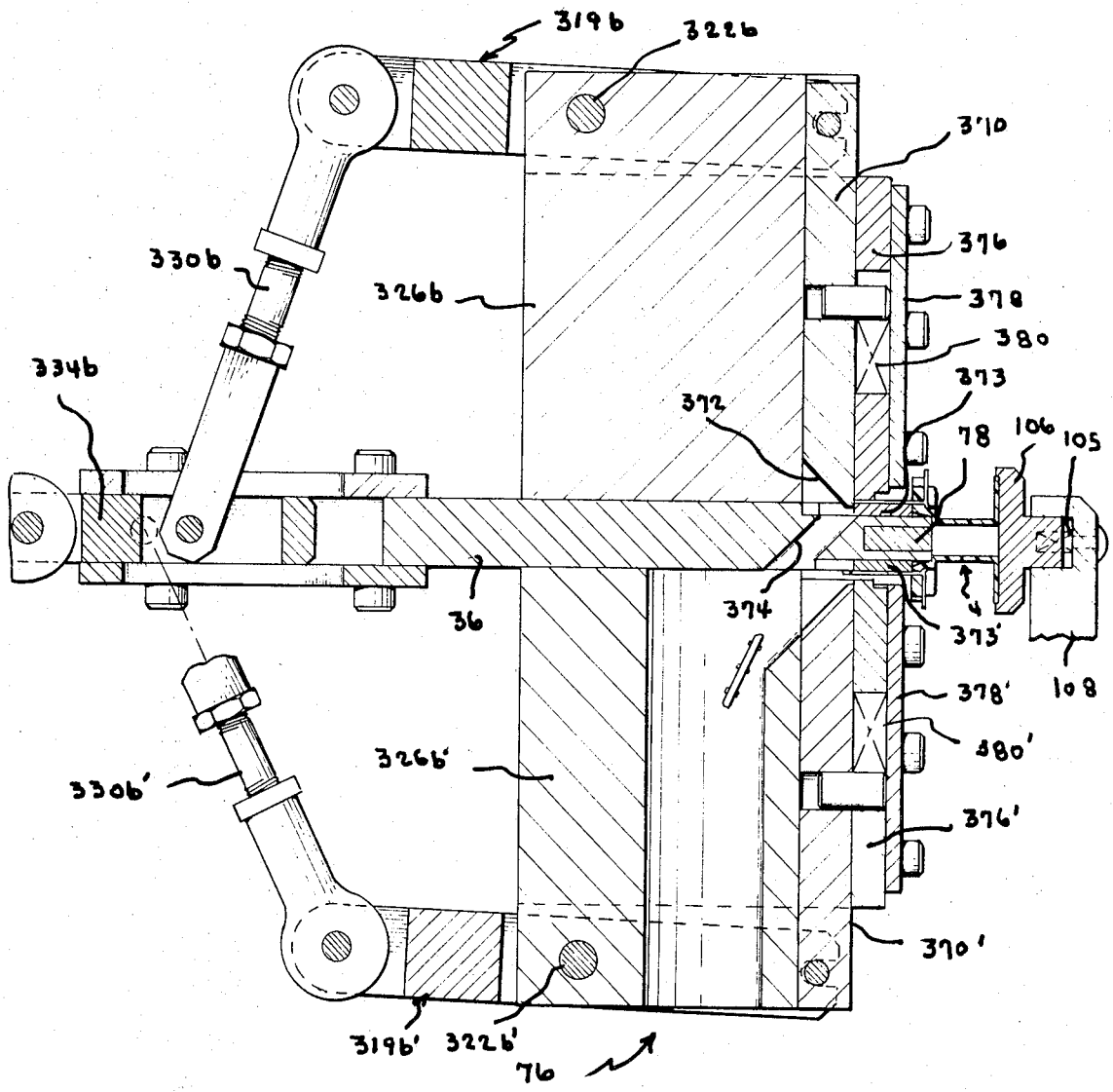

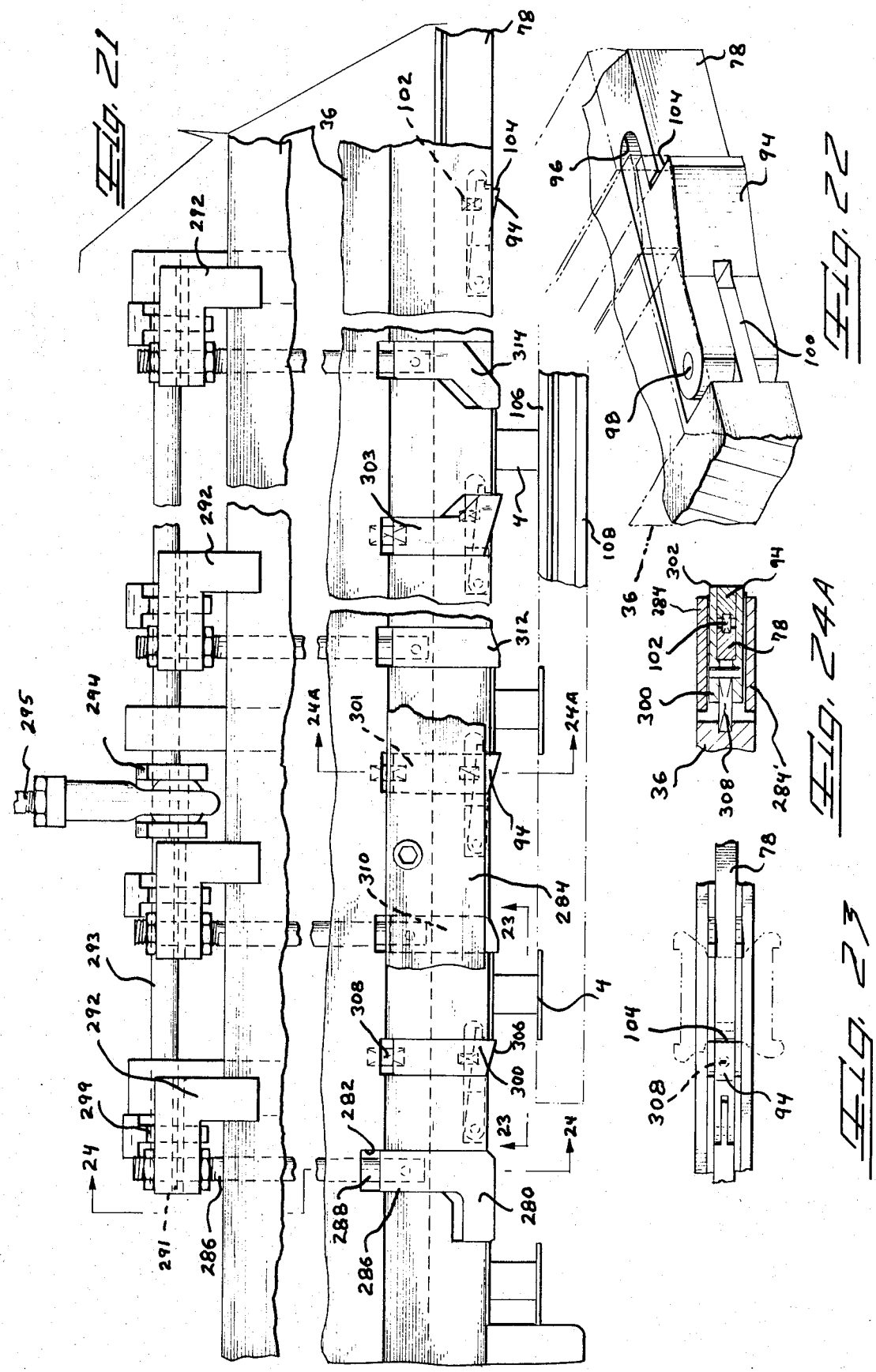

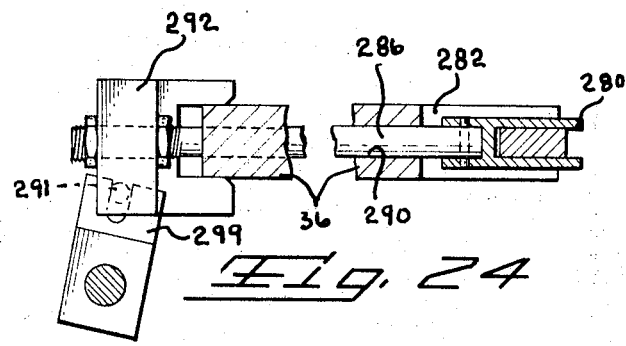
Fig. 24
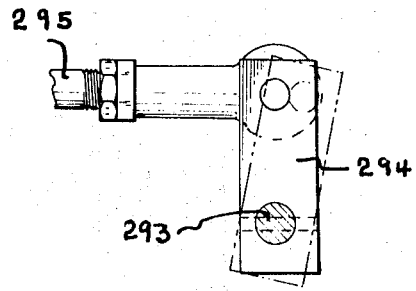
Fig. 25
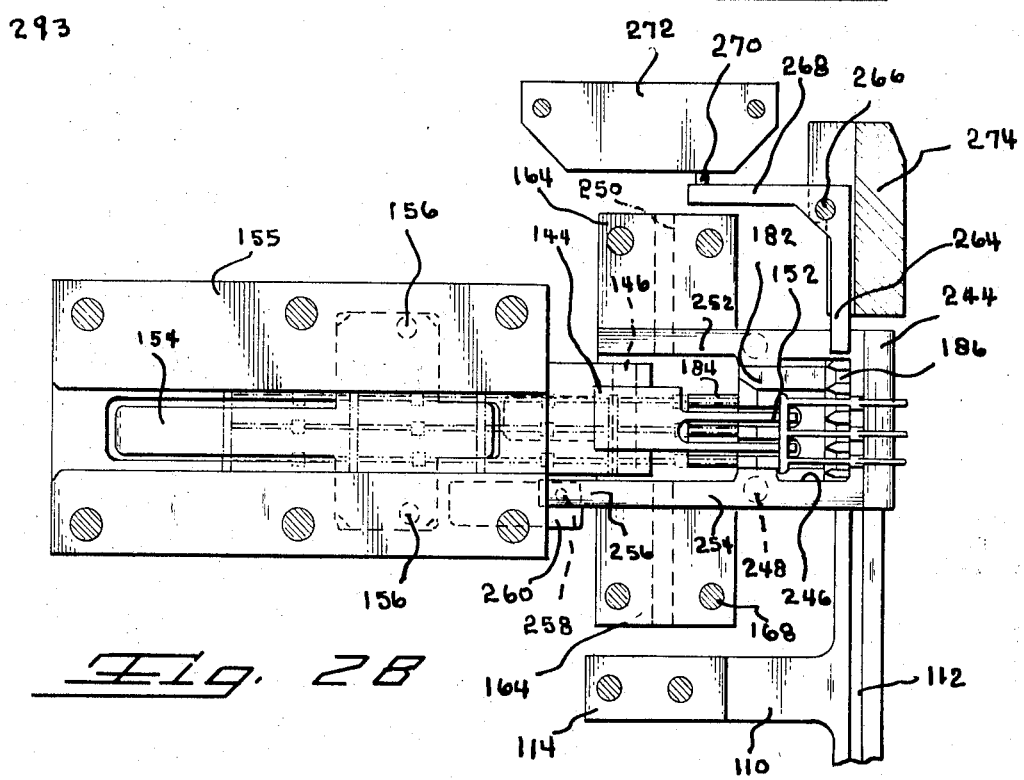
Fig. 28
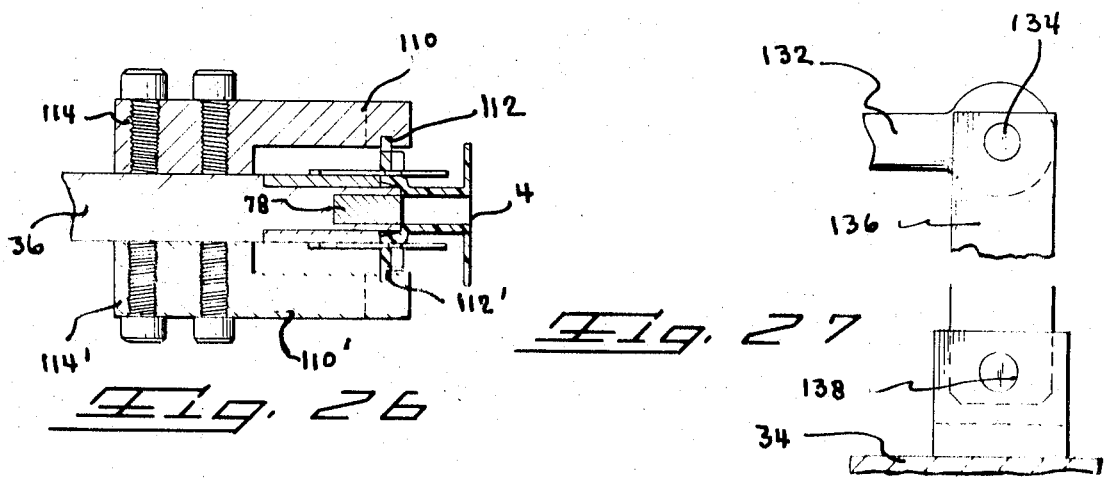
Fig. 26
Fig. 27

United States Patent Office 3,562,903
Patented Feb. 16, 1971

3,562,903
ASSEMBLY OF TERMINALS TO BOBBINS
Willard Le Roy Busler, Howard Charles Phillips, and
Milton Dean Ross, Harrisburg, Pa., assignors to AMP
Incorporated, Harrisburg, Pa.
Filed Apr. 30, 1968, Ser. No. 725,299
Int. Cl. H01f 7/05
U.S. Cl. 29—602                                               1 Claim

ABSTRACT OF THE DISCLOSURE

Elongated terminals are manufactured as a continuous strip made up of four side-by-side parallel columns of end-to-end connected terminals, these columns of terminals defining successive rows of side-by-side terminals, each row being separated from the next adjacent row by a transversely extending slug strip. A plurality of terminals are assembled to a bobbin or the like by feeding the strip until the leading ends of the leading row of terminals extend through a flange of the bobbin. The leading row, and the slug strip integral with the trailing ends of the terminals in the leading row, is severed from the next adjacent row of terminals. This slug strip remains integral with the inserted terminals until further forming operations are carried out and functions to maintain alignment of the terminals in the bobbin during these forming operations. The subsequent forming operations, in the disclosed embodiment, comprise the steps of bending the leading ends of the terminals through an angle of 90° until they lie in the plane of the flange of the bobbin. The terminals are thereafter staked to the bobbin flange and the slug strip is then severed from the trailing ends of the terminals.

BACKGROUND OF THE INVENTION

This invention relates to an improved form of terminal strip and to a method and apparatus for assembling terminals to a workpiece such as a flange of a coil bobbin. While the disclosed embodiment of the invention relates specifically to coil bobbins and to the assembly of terminals thereto, other uses of the invention will be apparent to those skilled in the art.

A conventional electrical coil of the type used in the communications industry or in the manufacture of solenoids comprises a bobbin, usually of plastic, having flanges on its ends and a winding of an insulated conductor on its neck portion. Terminals are provided in one or more of the flanges of the bobbin and the taps from the coil are led out to these terminals and electrically connected to one end of each terminal, the connections to the external circuitry being made to the other ends of the coils. The wire is automatically wound on the bobbin and it is desirable, therefore, to assemble the terminals to the bobbin flanges prior to the winding operation. Because of the very large number of coils used and because of the fact that the cost of the coil must be maintained at a minimum level, it is desirable to automate the operation of inserting the terminals ino bobbin flanges as well as the winding operations.

The present invention has for one of its objects the provision of an improved method of assembling terminals to bobbins and performing subsequent forming operations on the terminals to prepare the bobbins for the coil winding operation. A further object is to provide an improved form of terminal strip which facilitates the assembly of terminals to bobbins. A still further object is to provide an improved apparatus for assembling terminals in strip form to bobbins and performing subsequent bending and staking operations to secure the terminals to the bobbins.

These and other objects of the invention are achieved in a preferred embodiment thereof in which end-to-end connected terminals are manufactured in the form of a continuous strip comprising two or more parallel columns of terminals, these columns defining successive rows of side-by-side terminals. Connecting slug strips extend transversely between adjacent row of terminals and are integral with the terminals of the trailing end of one row and with the terminals in the leading end of the next adjacent row.

In accordance with the method aspect of the invention, a strip, as described above, is fed towards a bobbin and the terminals of the leading row of the strip are fed through openings in one of the bobbin flanges. The leading ends of these terminals are thereafter bent until they extend in the plane of the bobbin flange and an intermediate portion of each terminal is staked to the bobbin flange to secure the terminals firmly in position. During these bending and staking operations, the transverse slug strip remains integral with the trailing ends fo the terminals thereby to maintain them in precise alignment relative to the bobbin flange. After the terminals have been firmly secured in the bobbin flange by bending and staking, this slug strip is removed so that the bobbin is then prepared for the coil winding operation. In many instances, it is desirable to assemble terminals to flanges on opposite sides of the bobbin and the diclosed embodiment of the present invention is, therefore, provided with duplicate inserting bending, staking, and severing stations for simultaneously inserting stations on such opposite flange.

In the drawings:

FIG. 1 is a perspective view of a typical coil bobbin;

FIG. 2 is a perspective view showing the successive terminal insertion, terminal bending, terminal staking, and slug cut-off operations carried out in accordance with the invention, the bobbins being omitted from the two central stations in this figure in the interest of clarity;

FIG. 3 is a sectional side view of a bobbin having terinals assembled thereto, this view being taken along the lines 3—3 of FIG. 2;

FIG. 4 is a fragmentary view taken along the lines 4—4 of FIG. 3 and showing the manner in which the terminals are secured in openings in the bobbin flange;

FIG. 5 is a perspective view of an individual terminal;

FIG. 6 is a top plan view of a preferred form of apparatus in accordance with the invention;

FIG. 7 is a diagram illustrating the manner in which FIGS. 8, 9, 10, and 11 can be spliced to each other to produce a plan view, on an enlarged scale, of the frontal portion of the apparatus shown in FIG. 6;

FIG. 12 is a diagram illustrating the manner in which FIGS. 13, 14, 15, and 16 can be spliced to produce a front view of the apparatus of FIG. 6;

FIGS. 17, 18, 19, and 20 are sectional views taken along the lines 17—17, 18—18, 19—19, and 20—20 of FIG. 6;

FIG. 21 is a fragmentary plan view of the upper surface of a main frame plate of the apparatus showing details of a latching means at the several stations for holding the coil bobbin at the working stations;

FIG. 22 is a fragmentary perspective view showing details of the bobbin transfer slide;

FIGS. 23, 24, 24A, and 25 are views taken along the lines 23—23, 24—24, 24A—24A, and 25—25 of FIG. 21;

FIGS, 26 and 27 are views taken along the lines 26—26 and 27—27 of FIG. 6; and

FIG. 28 is a sectional plan view of the terminal insertion stations 70, this view being taken along the lines 28—28 of FIG. 17.

Referring first to FIGS. 1–5, the disclosed embodiment of the invention is adapted to insert terminals 2 into upper and lower flanges 9, 10 on one end of a bobbin 4. The bobbin comprises a neck portion 6 having flanges 8, 9, 10 at its opposite ends, the flanges 9, 10 having suitable recesses 12 in their edges for reception of the terminals and having openings through which the terminals are fed, as shown in FIG. 2. The individual terminals 2 have a notched leading end 16, a pair of laterally extending ears 18 intermediate their ends, and a trailing end 20 which may be provided with a stiffening rib 22. The ears 18 extend forwardly toward the leading end 16 and are partially sheared along the sides of the terminal so that they may be bent downwardly and staked to the bobbin flange as described below.

The terminals 2 are manufactured in the form of a continuous strip comprising three or four (in the disclosed embodiment) parallel columns 30 of individual terminals, the terminals of each column defining side-by-side rows 28. The leading ends of the terminals of each row are integral with a transversely extending slug strip 32 which is also integral with the trailing ends of the terminals of the next adjacent row.

The method aspect of the invention is illustrated in FIG. 2 which shows the successive steps of feeding terminal strips towards a bobbin, bending the strips, clinching the ears 24 to the bobbin flanges, and finally severing the transverse slug strips from the inserted terminals. In the particular embodiment disclosed, a strip of terminals having three side-by-side columns is fed towards the upper flange 10 and a strip having four side-by-side columns is fed towards the lower flange 9. At the beginning of the operating cycle, the leading ends of the terminals in the leading rows of terminals will be free in that a slug strip will not be connected to these leadings ends. The terminals of the leading rows are inserted through openings in the flanges of the bobbin until the laterally extending ears 18 bear against the outwardly facing surfaces of the flanges. Thereafter, the inserted rows of terminals, both the upper row and the lower row, are severed from the terminal strips but the transversely extending slug strips 32 remain on the trailing ends of the terminals and maintain the terminals in alignment with each other and properly positioned in the bobbin until subsequent forming operations have been carried out. The leading ends of the terminals are then bent through a 90° angle as shown in the second view of FIG. 2 so that they extend parallel to the plane of the flanges 9 and 10. The ears 24 are then staked downwardly in recesses 13 to securely lock the terminals to the bobbin flanges. Finally, at the last station, the slug strips 32 are severed from the trailing ends of the terminals in the flanges 10 and the bobbin is ready for the coil winding operation.

In the preparation or assembly of terminals to bobbins as generally illustrated in FIG. 2, it is important that the individual terminals of the upper and lower rows be maintained in precise alignment with each other during the bending and staking operations so that the leading ends of the terminals will be lodged in the recesses 12 and the staked ears will be properly positioned on each side of these bobbins against the surfaces 11. It is also important that the lengths of the trailing ends of the terminals of the rows be precisely equal to each other. The slug strips 32 which remain integral with the trailing ends of the terminals during the bending and staking operations assure that the requirements set forth above are met. Thus, the slug strips maintain the terminals of the rows in precise alignment while the bending and staking operations are being carried out. When the slug shearing operation is carried out, the trailing ends of the terminals are sheared along a transversely extending line and these trailing ends will be of precisely the same length. It follows that these slug strips perform a vital function during the bending and staking operations although they are removed after the bending and staking operations have been carried out and form no part of the finished assembly. The resulting advantage is that two or more terminals can be inserted through the bobbin flange simultaneously without sacrifice of dimensional tolerances or other quality considerations.

Referring now to FIGS. 6 and 13–16, a preferred form of apparatus for carrying out the method as described above comprises a base plate 34 and a horizontal frame plate 36 which is supported above the surface of the base plate by suitable vertical support plates 38, 40, 42, and 46. Power is supplied to the apparatus by means of a belt 52 which is driven by a suitable motor (not shown) and which passes over a pulley 50 mounted on one end of a shaft 54. The shaft 54 extends horizontally over the back surface of the base plate and is supported by suitable vertical plates 56, 58, and 60 having bearings mounted therein. A second shaft 64 extends forwardly adjacent to the pully 50 and is coupled to the shaft 54 by means of a suitable right angle drive 62. The shaft 64 is similarly supported in upstanding plates 66, 68 having bearings mounted therein.

The bobbins are loaded in the machine at a loading and terminal inserting station 70 and carried from this station to a bending station 72 at which the leading ends of the terminals are bent to a staking station 74 at which the ears are staked to the terminals, and then to a slug severing station 76 at which the transversely extending slugs are severed from the trailing ends of the terminals. The bobbins are transferred from station to station by a reciprocable slide bar 78 contained in a slot in the front edge of the frame plate 36, see FIGS. 17, 21, and 22. The lefthand end 80 of this slide bar is coupled to a slide block 82 in a block structure mounted on the frame plate 36 between gibs 84. The slide 82, in turn, is pivotally connected at 86 to a connecting rod 88 which, in turn, is pivoted at 90 to an eccentric 92 on the shaft 64 so that during each complete revolution of the shaft 64, the slide bar 78 is reciprocated. During such rightward movement, the slide bar pushes the bobbins at the several stations to the next station and ejects a bobbin from the severing station 76.

The bobbins are pushed from each station to the next station by feed pawls 94 (FIG. 21) mounted in recesses 96 in slide bar 78. As shown in FIG. 22, these pawls are pivoted to ears 100 integral with the slide bar and have inclined projections 94 extending beyond the front surface of the slide bar. These inclined surfaces define rightwardly facing shoulders 104 which push the bobbins during movement of the slide bar. Springs 102 bias the pawls outwardly but permit inward movement of the pawls during retractile movement of the slide bar past bobbins held at the several stations. The bobbins are guided from the station 72 to the station 76 by means of a guide bar 106 (FIGS. 18–20) which extends parallel to the transfer slide bar 78 and which has a recess for reception of the flanges 8 of the bobbins. The guide bar 106, in turn, is supported by a bracket 108 which is supported by, and secured to, the underside of plate 36 by cantilever brackets 107. Springs 105 interposed between the bracket and the guide bar 106 urges the guide bar leftwardly in FIG. 18 so that the bobbins are lightly clamped.

As shown in FIGS. 14 and 15 that the guide bar 106 extends leftwardly to the bending station 72. The bobbins are guided from the inserting station 70 to the station 72 by a guide means 110, 110' (FIG. 26) comprises T-shaped blocks secured to the upper and lower surfaces of the plate 36 and having head portions which extend parallel to the front edge of the plate 36. The undersides of these head portions are provided with grooves 112 which receive the flanges 9, 10 on the upper and lower sides of the inner ends of the bobbins.

INSERTION AND LOADING STATION

FIGS. 9, 14 17, and 28

As shown in FIG. 17, substantially identical feeding means are provided on the upper and the lower surfaces of the plate 36 at the insertion station 70. Since these inserting means are substantially identical, a description of one will suffice for both and the same reference numerals, differentiated by prime marks, will be employed for corresponding structural elements on the upper and lower sides of the frame plate. The inserting means and the allied structure on the upper side only of the plate 36 will, therefore, be specifically described below and reference will be made to the lower inserting means where appropriate.

The feeding mechanism is driven by a reciprocable feed slide 116 mounted on the upper surface of the plate 36 between gibs 118. Slide 116 has an upwardly extending pin 120 which is received in a notch 122 of an upper arm 123 of a lever 124 (FIGS. 6 and 9), the lefthand end of this lever as viewed in FIG. 6 being pivoted at 126 between ears 128 extending from the plate 48. A connecting rod 132 is pivotally connected at 130 to the lever 124 intermediate its ends and extends rearwardly above the plate 34. The end of the connecting rod 132 is pivoted at 134 to the upper end of a lever 136 which, in turn, is pivotally mounted on the upper surface of the plate 34 (FIG. 27). A cam follower 140 on the side of the lever 136 is received in a cam track of a cam 142 mounted on the shaft 54. It will thus be apparent that during each complete revolution of the shaft 54, the connecting rod 132 will be moved forwardly and then returned to its starting position to actuate the feed mechanism. The feed slide 116 which is mounted against the lower surface of the plate 36 is actuated by the lower arm 123' of the lever 124 and moves in unison with the upper feed slide 116.

The terminal strip is fed over the upper surface of the plate 36 by means of a feed finger 144 (FIG. 17) pivoted intermediate its ends on a pin 146 which extends across a recess 148 in the leading end of the feed slide 116. A spring 150 is interposed between the surface of the feed slide and the rearward end of the feed finger to bias the finger in a clockwise direction as viewed in FIG. 17 so that its leading end will be urged into engagement with the terminal strip. The leading end of the feed finger is relatively wide and engages the slug strip 32 behind the leading row of terminals of the strip. As shown in FIG. 28, this leading end of the feed finger is notched to selectively engage this strip at the desired locations.

A light drag or hold down force is imposed on the terminal strip beneath the feed slide by a hold down plate 154 (FIG. 17) which extends across the terminal strip and is biased downwardly by means of springs 156 mounted in recesses in the gibs 118. The strip is guided towards the bobbin located at the insertion station and by means of a fixed guide plate 155 mounted on the surface of the plate 36 and surrounding the terminal feed path and the drag plate.

In order to permit servering of the leading row of terminals from the terminal strip by movable and fixed shearing members 184, 185, a yieldable support plate 158 is mounted in a recess 162 adjacent to the right hand end of the feed track as viewed in FIG. 17. Support plate 158 is biased upwardly by springs 160 so that its upper surface is normally coplanar with the surface of the plate 36 but is permitted to move downwardly against the biasing force of the springs 160 when the servering blade 184, described below, moves downwardly. A counterpart support plate 158' for the strip being fed over the underside of the plate 36 is similarly biased by the springs 160 which are interposed between the two plates mounted in the recess. As shown in FIG. 17, these plates have shoulder means which interengage with the fixed shear plates 185, 185' and fixed hold down plates 187, 187' secured to frame plate 36 to retain them in position.

The terminal strip is fed through an opening 172 in a shear blade housing 164 secured to the upper suface of the plate 36 by fasteners 168 then through an opening 176 in an upstanding plate 166 which is secured to the front side of the shear blade housing by fasteners 174. Housing 164 has a vertically extending channel-shaped groove 170 in which the blade 184 is slidably contained, the lower edge of this blade being normally disposed above the surface of the strip to permit passage of the feed finger as illustrated in FIG. 17.

In order to accurately guide the leading row of terminals into the openings in the bobbin flange, a guide plate 178 is mounted against the surface of fixed plate 166. A space is provided between the lower end of this plate an dthe surface of shear plate 185 to permit passage of the leading row of terminals to the bobbin. This plate has leftwardly extending (as viewed in FIG. 17) fingers 182 which extend over the individual terminals of the row. Plate 178 is normally biased downwardly by means of a coil spring 180 mounted in a recess of the plate 178 and having one end anchored to the plate and having its other end secured to a pin extending from the surface of the plate 166. By virtue of this resilient mounting of the plate, it can be raised slightly to clear any jams which might occur by means of pins 189 which extend laterally beyond plate 166.

The terminal strip is firmly clamped during the shearing operation by means of a clamping plate 186 mounted next to the hold down plate 178 and contained by a cover plate 183 secured to the sides of the fixed plate 166. As shown in FIG. 14, the upper end of the clamping plate 188 is pivotally connected at 194 to a bell crank 190, and the upper end of this bell crank is connected by means of a pin 196 to a link 200. As shown best in FIG. 17, pin 196 extends through an elongated slot 198 in the link 200 and a spring 202 mounted in this slot bears against the pin so that he clamping plate 186 is resiliently biased against a strip when the clamping plate is in its lowered position. The upper end of the link 200 is pivotally mounted on a pin 204 which extends through a cap piece 206 secured by fasteners 208 to the upper end of the plate 166.

The shear blade 184 is pivotally connected to a bell crank 192 on the lefthand side, as viewed in FIG. 17, of the plate 166. This bell crank, in turn, is directly pivotally connected to one end of a link 201, the other end of this link being pivoted to the pin 204 which extends through the cap piece 206.

The togle linkage comprising a bell crank 190 and the link 200 by means of which the clamping plate 186 is driven downwardly is straightened by means of a connecting rod 210 pivotally connected at 212 to the bell crank 190, see FIG. 14. The end of this connecting rod 210 is pivoted at 214 to a lever 216 which extends vertically through a recess in block 85 on which the gibs 84 are mounted, and is pivoted on a pin 218 in this recess in this block. The upper end of this lever is offset in order to provide clearance for an additional lever 238 described below. A further connecting rod 222 is pivotally connected at 220 to the lower end of the lever 216 (beneath the composite block 85) and extends leftwardly past the plate 48 (FIG. 13). The end of connecting rod 222 is pivoted to a lever 224 which is pivotally mounted at 226 between ears extending from the plate 48. The lever 224 extends upwardly as viewed in FIG. 13 and has a cam follower 228 on its end which is received in a cam track of a cam 230 mounted on the shaft 64. It will thus be apparent that during each complete revolution of the shaft 64, the connecting rod 222 will be moved leftwardly and rightwardly as viewed in FIG. 14 to straighten the toggle mechanism 190, 200 and move the clamp 186 against the row of terminals being inserted into a bobbin. It will be noted from FIG. 14 that the corresponding toggle structure 190', 200' for the lower clamping member 186' is arranged to be straightened when the lower end of the lever 216 moves leftwardly while the upper toggle structure 190, 200 is straightened when the upper end of the lever 216 moves rightwardly. The lower clamping structure is otherwise similar to the upper clamping structure.

The toggle mechanism 192, 201 for the shear blade 184 is straightened during each operating cycle by means of a connecting rod 240 which has one end pivotally connected to the bell crank 192 and has its other end pivotally connected to the upper end of a lever 238. Lever 238 is also mounted intermediate its ends on the pivot pin 218 in the composite block 85 and is oscillated during each operating cycle by means of a connecting rod 236 which has its right hand end (FIG. 14) pivoted at 235 to the lever 238 and has its lefthand end pivotally connected to a lever 234 adjacent to a cam 232 on the shaft 64. The lower end of the lever 234 is also pivotally mounted on ears extending from the plate 48 and a cam follower on one side of this lever is received in a cam track of the cam 232. During each complete revolution of the shaft 64, the cam 232, acting through the liners and connecting rods 234, 236, 238, and 240, straightens the toggle mechanism 192, 201 and thereby drives the severing blade downwardly as viewed in FIG. 17. The lower severing blade 184' is driven upwardly by a similar toggle mechanism mounted on the lower plate 166'. It is desirable to leave a slight time interval between the severing operations for the upper and lower strips in order to reduce the power requirements for the apparatus to reduce the level of the stresses imposed on the parts. This can be done by, for example, designing the toggles 192, 201, 192', 201' such that they are straightened at different times.

The bobbin at the insertion station is held in position by means of a clamp 244 and 244'; each having a central opening 246 through which the upper and lower shear blades and the plates 186, 186' extend. Clamp 244 is pivotally mounted on pin 250 which extends into block 164 on opposite sides of the terminal feed path. The arms 252, 254 on each side of this opening extend rearwardly over the upper surface of the plate 36 and are biased downwardly by means of springs 248 with respect to pivot pins 250 extending from the fixed block 164. The arm 254 has a rearwardly projecting extension 256 which bears against a switch button 258 of a switch 260. When a bobbin is positioned in the insertion station, the clamping member 244 will be swung through a counterclockwise straight arc against the biasing force of the spring 248 and the arm extension 256 will close the switch 260. This switch, its counterpart on the underside of the plate 36, and a third switch described below must all be closed before the cycle can be started. The lower clamping member 244' is swung through a slight clockwise arc and the bobbin is clamped between the two members 244, 244'.

The remaining switch for the circuitry is controlled by a bell crank pivoted to 266 and having one arm 264 which is engaged by the inserted bobbin. The other arm 268 of the bell crank moves against the switch button of the switch 272 when the bobbin is inserted. It will thus be apparent that the cycle can not be initiated until a bobbin has been properly inserted at the inserting station with the openings in the bobbin flange in alignment with the leading ends of the terminals of the leading row. The switches 270, 260, 260' are arranged to initiate the cycle through a suitable clutch immediately upon insertion of the bobbin.

A positioning guide or gauge 274 is mounted on the front edge of the plate 36 and has a right-facing surface 274 as viewed in FIG. 9 against which one side flange of the bobbin is located. The right hand side of the inserted bobbin is held against surface 274 in position by means of a cam controlled latch member 280 (see FIG. 21). Latch 280 is mounted in a recess 282 of a cover strip 284 and has a rearwardly extending arm 286 which is secured to a connecting rod 288. This rod extends through an opening 290 in the plate 36 and has a yoke 292 on its rearward end which is slotted to receive the edge portions of the plate 36 for guiding purposes (FIG. 24), yoke 292 has a pin-slot connection 291 with an arm 299 keyed or otherwise secured to a shaft 293. Shaft 293 extends parallel to the rearward edge of the lefthand portion of the plate 36 and has an additional arm 294 (FIG. 25) which is pivoted to a connecting rod 295. This connecting rod extends rearwardly as viewed in FIG. 6 and is pivoted to a lever 296 which is pivoted at its lower end to plate 34 and has a cam follower 297 mounted thereon. Cam follower 297 is received in a cam track of a cam 298 mounted on the shaft 54 so that during each complete revolution of the shaft 54, the shaft 293 is oscillated thereby moving the control rod inwardly then outwardly with respect to the plate 36. Upon outward movement of this control rod, a latch 280 is retracted to permit transfer of a bobbin from the inserting station 70 to the bending station 72. The latch member is moved outwardly for the next operating cycle, to aid in positioning a new bobbin in the clamps 244, 244'.

Similar cam controlled latches 310, 312, 314 are provided at the bending station, the staking station, and the slug severing station as shown in FIG. 21. While these latches differ slightly from the latch member 280, their essential function is the same as that of the latch member 280. These latch members are cam controlled for the reason that they must be moved from the feed path of the bobbins which extend along the leading edge of the frame plate at the time of transfer of the bobbins from station to station.

The bending station, the staking station, and the slug severing station are provided with additional latch means 300, 301, and 303. These latches extend outwardly beyond the edge of the transfer slide bar 78 and provide rightwardly facing surfaces against which the bobbins bear at the several stations. The sides of these latch members are inclined as shown at 306 to permit movement of the bobbins past the latches with concomitant inward movement of the latch members against the force of the biasing springs 308. Since these latch members are moved inwardly by the bobbins, it is unnecessary to provide positive cam control as is the case with the latch member 380. Again, the latch member 303 differs slightly in structure from the latch members 301, 300 although its function is essentially the same.

The sequence of operations at the insertion station is as follows. At the beginning of the operating cycle, the leading rows of terminals will have been severed from the terminal strips during the previous operating cycle and the feed finger 144 and feed slide 116 will be adjacent to the severing blades 184, 184' with the transversely extending slug which is integral with the rearward ends of the leading row of terminals disposed immediately in back of the fixed shear members 185, 185'. In order to initiate the cycle, the operator positions a bobbin between the clamps 244, 244' by forcing these clamps apart with the bobbin flanges 9, 10. When the bobbin is properly positioned between these clamps, the switches 270, 260, 260' will be closed and a suitable single revolution clutch on the pulley will be engaged. This clutch causes the shafts 54, 64 to be rotated through a single revolution. During about the first half of the cycle, the leading rows of terminals are threaded rightwardly in FIG. 17 until the parts occupy the position of FIG. 17 and the leading ends of the terminals extend through the openings in the bobbin flanges 9, 10. During the final portion of the operating cycle, the feed slide 116 is retracted and the next row of terminals are fed until the slug strips 32 are positioned in front of the feed shears. At the very end of the operating cycle, the movable shear blades 184, 184' move inwardly to shear the next adjacent rows of terminals from the strip. As shown in FIG. 28, the lower end of shear blade 184 has four shearing fingers which move between slots in the leading ends of the feed finger during the shearing operation. The lower shearing blade and feed finger are similarly constructed. As previously noted, the movement of the shear blades 184, 184' is staggered in order to reduce power requirements and lower the stress levels. The terminal clamping members 186, 186' are moved into clamped engagement with the strips after feed has taken place (towards the end of the operating cycle) and are disengaged from the strips during the intermediate portions of the cycle while insertion is being carried out.

The transverse slide bar 78 is retracted (moved leftwardly in FIG. 6) during the first half of the operating cycle and moves rightwardly to transfer the bobbins from station to station during the final portion of the operating cycle. Since the insertion of the leading ends of the leading rows of terminals takes place before rightward movement of the transverse slide bar 78 begins the movement of this slide bar does not interfer with the terminal insertion operation. The partial feed of the terminal strip towards the end of the operating cycle and the severing of the feed strips by the shearing blades 184, 184' is not effected by the movement of the transverse slide bar for the reason that these strip feeding and severing operations take place behind the transverse slide.

BENDING STATION
FIGURES 10, 15, AND 18

At the bending station, the ends of the terminals which project past the flanges 9, 10 are bent upwardly and downwardly by bending fingers 316, 316' actuated in a manner described below. Two bending mechanisms are provided, one being above the surface of the plate 36 and one being beneath the surface of the plate for the terminals on the opposite sides of the bobbin. Again, these bending mechanisms are substantially similar to each other so that the description of the one will suffice for both and the same reference numerals, differentiated by prime marks, will be employed to denote corresponding structural elements on the upper and lower sides of the plate 36.

In FIG. 18, the structural parts of the upper bending mechanism (shown with solid lines) occupy the position of the beginning of the bending operation and before actual bending has taken place. The structural parts of the lower bending mechanism (broken lines) show the positions of the parts after the leading ends of the terminals have been bent. Referring specifically to the upper bending mechanism, the bending finger 316 has an inwardly directed lip 318 on its lower end which is disposed beneath the ends of the terminals at the beginning of the cycle and over which the terminals move when the bobbin is transferred from the insertion station to the bending station. The finger 316 is secured to one arm 320 of a bell crank 319 pivoted at 322 between a pair of spaced-apart ears 324 of a block 326 mounted on the upper surface of the plate 36. The rearwardly extending arm 328 of this bell crank is pivotally connected to a connecting rod 330 which extends to, and is pivotally connected to, a slide block 334. This slide block is reciprocably mounted in an opening 336 in the plate 36 and retained in position by suitable mounting plates 333. Slide block 334 is pivoted to one end of a rearwardly extending connecting rod 340 (FIG. 6) which is connected at its rearward end to the upper end of the lever 342 similar in function and structure to the previously described lever 136. Intermediate its ends, lever 342 has a cam follower 344 which is received in a confined cam track of a cam 346 mounted on the shaft 54. During each revolution of the shaft 54, the connecting rod 340 is moved rightwardly thereby to move the slide block 334 rightwardly to the limit of its travel in the opening 336. This movement of the slide block causes the bell crank to be swung through a slight clockwise arc and thereby move the finger lip 318 along an arcuate path to bend the leading end of the terminals. The lower bell crank 319' moves through a counterclockwise arc during the same interval.

The trailing ends of the terminals in the bobbins are held in position by a positioning device, comprising a depending lip 360 of a block 358 disposed between the front surface of a housing 353, which is straddled by the block 326, and a fixed plate 351. The block 358 is actuated by a lever 352 contained in a recess 350 in the housing 353 and is pivotally mounted intermediate its ends by means of a pin 354. A spring 356 interposed between the rearward end of the lever 352 and the surface of the plate 36 normally biases the lever in a clockwise direction so that the depending lip 360 is urged downwardly as viewed in FIG. 18 and behind the trailing ends of the terminals. During transfer of the bobbins from one station to another, the lip 360 is raised by means of a set screw 348 mounted in the bell crank arm 328 which has a lower end portion projecting through the upper wall of the block 326. The lower end of this set screw bears against the rearward end of the lever 322 forcing it downwardly against the biasing force of the spring 356 and holding the lip 360 in a raised condition. In FIG. 18, the upper lip 360 is shown in its raised condition while the lower lip 360' is positioned in an opening behind a support plate 359 for the terminals. It will be apparent from this view then that the terminals are precluded from axial movement during the actual bending operation.

THE STAKING STATION
FIGURES 10, 15, AND 19

The staking station comprises upper and lower staking mechanisms which are operated in out-of-phase relationship like the shearing mechanisms of the inserting station 70 in order to minimize power requirements and stresses imposed on the frame structure. FIG. 19 shows the positions of the parts after the lower staking mechanism has been actuated and immediately prior to actuation of the upper staking mechanism.

The staking tool comprises a block 362 mounted against a mounting plate 363 on the front side of a fixed block 324a. The lower end of the staking tool has a semicircular recess 366 and a projecting lip 368 on one side of this recess which is adapted to move against the ears 24 on each side of the terminal. Recesses are provided on the lower end of this tool to permit the end of the tool to move past the walls separating the recesses 12. As will be apparent from a comparison of the upper and lower staking mechanisms of FIG. 19 that these staking tools 362, 362' move linearly inwardly to stake the ears 24 to the hub of the bobbin and to bend or set the leading ends of the terminals, this setting of the leading ends of the terminals being accomplished by a surface 365 on the opposite side of the recess 366 from the lip 368. The staking tool 362 is actuated by means of a bell crank 319a which has a pin-slot connection 364 with the tool. Bell crank 319a is similar in function to the bell crank 319 of the bending station (FIG. 18) and the actuating mechanism for this bell crank is in many respects similar to the actuating mechanism for the bell crank of the bending station. Accordingly, the same reference numerals, differentiated by the post script a, will be used to identify the structural parts of this bell crank and associated structure. Thus, the block 326a has a pair of spaced-apart ears 324a between which a pin 322a extends and on which the bell crank 319a is mounted. The rearwardly extending arm 328a of the bell crank is connected by means of a link 330a to a slide block 334a mounted between gibs on the upper surface of the plate 336. Slide block 334a, is reciprocated by means of a connecting rod 340a which extends to a pivoted lever 342a. This lever has a cam follower 344a thereon which is received in a cam track of a cam 346a on the shaft 54.

The bell crank 319a' on which the lower staking tool is mounted is connected by means of a link 330a' to a separate slide member 334a'. A separate cam 346a' is also provided to actuate the lower staking tool which is connected to the slide 334a' by means of a connecting rod 340a'. These separate cams for the upper and lower staking tooling are required in order to stagger the movement of the two staking tools.

The staking station 74 is also provided with upper and lower stop members 360a, 360a' which are actuated by levers 352a, 352a' as previously described in the specific description of the bending station.

SLUG SEVERING STATION
FIGURES 11, 16 AND 20

The transversely extending slug strips 32 are removed from the trailing ends of the terminals by shearing blades 370, 370' mounted in blocks 326b, 326b' at the shearing station 76. The upper shear blade 370 has a bevelled lower end 372 which cooperates with the fixed shear 373 mounted adjacent to the front edge of the plate 36. When a bobbin is positioned at this severing station, the trailing ends of the terminals will be positioned on the surface of the plate 373 and the slug strip will extend along, and beyond, the edge of this plate. Upon downward movement of the severing blade, the slug strip is removed from the trailing ends of the terminals and falls through an obliquely extending opening 374 in the plate 36 and through an opening in the lower block 326b'. The terminals are clamped against the surface of the plate 373 by means of a resiliently biased clamping plate 376 supported against the surface of the block by a cover plate 378 and biased downwardly by means of a spring 380 interposed between a pin extending from the shear blade 370 and an internal surface of the clamping block 376.

The actuating mechanism for the shear blade 370 comprises a simple straight lever 319b (rather than a bell crank as in the previous stations) pivoted intermediate its ends at 322b to the block 326b. The lefthand end of this lever is connected by means of a link 330b to a slide 334b mounted in an opening in the plate 36. This slide is reciprocable by means of a cam 298b which engages a cam follower on a lever 342b pivoted to the base plate 34. Lever 342b is connected to the slide by a connecting rod 340b. In FIG. 20, the upper shearing blade 370 is shown in the position it occupies after it is moved past the fixed shear 373 and severed the slug from the upper row of terminals in the upper flange of the bobbin. The lower shearing blade 370' is shown in its remote position with respect to the fixed shear 373'. It is understood that these two blades move in unison towards each other so that the lower part of the drawing shows the positions of the parts at the beginning of the operating cycle and the upper part of the drawing shows the positions of the parts after the slug has been severed from the terminals. After severence of the transversely extending slugs, at the station 76, the terminals are moved rightwardly by the transverse slide bar until they fall from the right hand end of the bobbin feed track. A suitable receptacle would ordinarily be placed beneath the end of the feed track to receive the bobbins as they are ejected by the machine.

While the disclosed embodiment of the invention is adapted to insert terminals into flanges on opposite sides of the bobbin, apparatus in accordance with the invention can be made to insert terminals into only one side if desired. Additionally, the principles of the invention can be adapted to machines adapted to insert terminals into the flanges at both ends of the bobbin if a configuration of this type is required.

Changes in construction will occur to those skilled in the art and various apparently different modifications and embodiments may be made without departing from the scope of the invention. The matter set forth in the foregoing description and accompanying drawings is offered by way of illustration only.

What is claimed is:

1. A method of assembling a plurality of elongated contact terminals to the flanges of a coil bobbin comprising the steps of:

manufacturing said terminals in the form of a continuous strip comprising a plurality of parallel columns of end-to-end connected terminals, said columns defining a plurality of successive rows of terminals with transversely extending slug strips separating each row from the next adjacent row, locating said flange with its plane extending normally of said strip and with the leading ends of the terminals of the leading row of said strip adjacent to said flange, feeding said strip relatively towards said flange until said leading ends extend through openings in said flange, severing the slug strip which extends across said leading row, from the leading ends of the terminals of the next adjacent row while leaving said slug strip integral with the trailing ends of the terminals of said leading row, bending said leading ends of said terminals until said leading ends extend parallel to the plane of said flange thereby to lock said terminals to said flange, staking said terminals of the now severed row to said flange, and severing said slug strip from the trailing ends of said terminals.

References Cited
UNITED STATES PATENTS

| | | | |
|---|---|---|---|
| 2,351,043 | 6/1944 | Heller | 227—79 |
| 2,471,869 | 5/1949 | Gebel | 336—192 |
| 2,610,390 | 9/1952 | Locke | 113—119X |
| 2,670,530 | 3/1954 | Regnier | 113—119X |
| 2,666,253 | 1/1954 | Norberg | 113—119 |
| 2,955,352 | 10/1960 | Wintriss | 29—630 |
| 3,054,165 | 9/1962 | Braun | 29—630D |
| 3,191,271 | 6/1965 | Johnson | 29—630D |
| 3,309,761 | 3/1967 | Deakin | 113—119X |
| 3,394,454 | 7/1968 | Logan | 113—119 |
| 3,445,797 | 5/1969 | Otto | 336—192 |

JOHN F. CAMPBELL, Primary Examiner

R. W. CHURCH, Assistant Examiner

U.S. Cl. X.R.

29—193.5, 203, 417, 418, 589, 605, 618, 621, 629, 630, 25.16; 227—79, 80; 113—119; 336—192